Feb. 17, 1925.  1,527,121
P. COTTRINGER ET AL
METALLIC CHLORIDE AND METHOD OF MAKING SAME
Filed Aug. 10, 1921
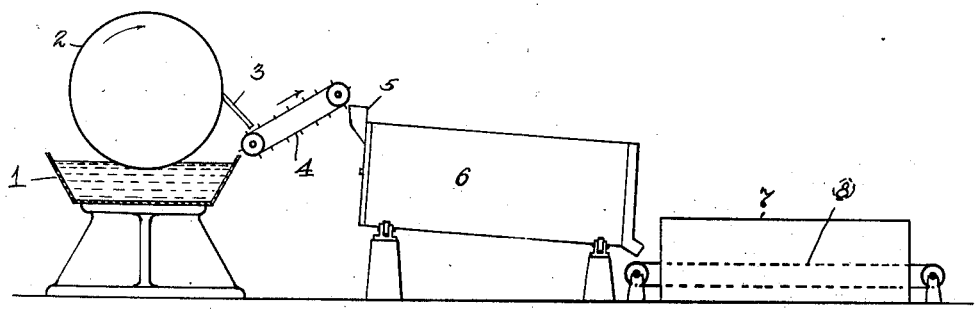
INVENTORS
Paul Cottringer and
BY William R. Collings.
Fay, Oberlin + Fay
ATTORNEYS.

Patented Feb. 17, 1925.

1,527,121

UNITED STATES PATENT OFFICE.

PAUL COTTRINGER AND WILLIAM R. COLLINGS, OF MIDLAND, MICHIGAN, ASSIGNORS TO THE DOW CHEMICAL COMPANY, OF MIDLAND, MICHIGAN, A CORPORATION OF MICHIGAN.

METALLIC CHLORIDE AND METHOD OF MAKING SAME.

Application filed August 10, 1921. Serial No. 491,084.

*To all whom it may concern:*

Be it known that we, PAUL COTTRINGER and WILLIAM R. COLLINGS, citizens of the United States, and residents of Midland, county of Midland, State of Michigan, have jointly invented a new and useful Improvement in Metallic Chlorides and Methods of Making Same, of which the following is a specification, the principle of the invention being herein explained and the best mode in which we have contemplated applying that principle, so as to distinguish it from other inventions.

Calcium chloride, as well as other hygroscopic chlorides of metals of Group II, and particularly of magnesium, have been marketed for some time past in flaked condition, produced by rotating a drum maintained at a suitable temperature in contact with a body of such chloride in fluid or molten condition, and then scraping off the layer of the material which adheres to the surface of the drum. However, the tendency of the flaked particles, and this is particularly true in the case of calcium chloride, ($CaCl_2$), is for such particles to coalesce or adhere together after being packed so as to form practically a solid body thereof again. Irrespective of the use to be made of the material, the characteristic thus referred to is obviously objectionable and has militated in no small degree against the successful employment of calcium chloride as a roadbinding material, for which it is excellently suited.

The object of the present invention, accordingly, is to produce a metallic chloride of the class referred to above, and particularly of calcium chloride in a flaked condition, such that it will not harden in the packages in time under any ordinary conditions, such hardening with the present material occurring at temperatures as low as from 115 to 135 degrees F., to which it may rise when the usual black iron drum container is exposed to the direct heat of the sun in summer.

To the accomplishment of the foregoing result, the invention, then, consists of the steps and product hereinafter fully described and particularly pointed out in the claims, the annexed drawing illustrating one typical form of apparatus adapted for the carrying out of such steps, such disclosed apparatus constituting, however, but one of the various ways in which the principle of the invention may be used.

In said annexed drawing—

The single figure there appearing illustrates in diagrammatic fashion an apparatus arranged for the carrying out of our improved process or method.

Ordinary flake calcium chloride contains approximately two molecules of water of crystallization, and the present improvement consists, briefly stated, in so treating such material that the surface of each and every particle will have been dried, with the result that the material can be exposed in bulk to a temperature of from 130 to 145 degrees F., or even higher, without caking. While, as indicated, the material heretofore marketed as flaked or granular calcium chloride contains approximately two molecules of water of crystallization, (the average analysis of such material being from 73 to 75 per cent anhydrous calcium chloride), the surface of the individual particle after such special drying probably contains a great deal more calcium chloride than the percentage range just given, and this may explain the absence of any tendency for such particles to stick together. The present process, however, is not based necessarily on this particular theory.

According to such process, molten calcium chloride, having approximately the composition of 71 to 75 per cent anhydrous calcium chloride, is run into a pan 1, into which the surface of a cooled roll or rotating drum 2 dips. Such roll, accordingly picks up the molten chloride in the usual fashion and carries it around until scraped off by a knife 3. Thence the flaked product is carried by a chain conveyor 4 to a chute 5, through which it is dropped into an internally fired rotary kiln 6, the temperature of the gases at the hot end of such kiln being held at approximately 400 to 475 degrees C. Such kiln of course may be fired by means of an oil burner, or the products of combustion passing therethrough may be derived from coal, coke or gas.

The dried material as discharged from the kiln 6 will have a temperature of approximately 150° C., and at this temperature a sweating phenomenon may occur, which may induce a tendency for the material to cake. However, this tendency may be removed by running the material through a cooling chamber 7 by means of an endless conveyor 8, or its equivalent, the temperature being reduced by passage through such chamber to approximately 100° C. It may then be safely packaged and if the temperature ranges indicated above have been observed in the several steps, a non-caking product results.

In referring to the temperatures to be observed, it will of course be understood that the length of time involved in each step, and particularly in the drying step, is an important factor. For example, the temperature in the drier kiln may be run as low as 110 degrees C., provided the rate at which the material is passed through the kiln is properly related to the volume of air pulled across such material as it is being dried. Where a temperature as low as the one just indicated is employed in the kiln the sweating phenomenon should not occur, and in such case it may be unnecessary to subsequently cool the material.

The product resulting from our improved process consists of particles retaining practically the same shape and size as the flake calcium chloride at present on the market, but the surfaces of the individual particles, as previously indicated, are given a supplemental individual driving incidentally to the passage of the material through the kiln, which so changes the character of such surfaces as to prevent the sticking together or solidifying of the material in the package or when stored in bulk. As indicated above our process is equally applicable to the production of a non-caking flake magnesium chloride, \which still retains a portion of the water of crystallization normally present in such chloride/ the mode of treatment being substantially identical as to the steps employed, but the temperatures in such steps requiring to be lower. Thus for example at the cool end of the dryer the temperature should not exceed 90° C., otherwise, such magnesium chloride will melt.

While only one specific mode of forming the "flake" product has been described herein, it will be understood that our improved method is generally applicable to such product whether made in this manner or by granulating the original material in any known way. Thus the molten chloride may be atomized, or the solid cake may be crushed, and the resulting particles subjected to a further drying operation as described, whereby the content of water in the surface layer of the individual particle, whether flake or granite, reduced below the normal or average in the original material, or the interior of such particle, and as a result the tendency of the particles to agglomerate or cake together is materially reduced.

Other forms may be employed embodying the features of our invention instead of the one here explained, change being made in the form or construction, provided the elements stated by any of the following claims or the equivalent of such stated elements be employed, whether produced by our preferred method or by others embodying steps equivalent to those stated in the following claims.

We therefore particularly point out and distinctly claim as our invention:—

1. The method of treating comminuted metallic salts containing water of crystallization and normally having a hygroscopic character so as to reduce their tendency to cake in the package, which consists in superficially drying the particles thereof, substantially as described.

2. The method of treating comminuted metallic salts containing water of crystallization to reduce their tendency to cake in the package, which consists in passing heated air over the particles thereof while being stirred so as to superficially dehydrate such particles, substantially as described.

3. In the manufacture of a metallic chloride containing water of crystallization and normally having a hygroscopic character, the steps which consist in preparing such chloride in the form of particles, and then drying such particles to remove water of crystallization present in the superficies thereof without completely dehydrating such particles, whereby the tendency of such particles to cake together in the package is reduced.

4. In the manufacture of calcium chloride, the steps which consist in preparing such chloride in the form of particles, and then drying such particles to remove water of crystallization present in the superficies thereof without completely dehydrating such particles, whereby the tendency of the particles to cake together in the package is reduced.

5. In the manufacture of a metallic chloride of the class described, the steps which consist in comminuting the fused material by cooling and mechanical means, and then drying the resultant particles to remove water of crystallization present in the superficies thereof without completely dehydrating such particles whereby the tendency of such particles to cake together in the package is reduced.

6. In the manufacture of calcium chloride, the steps which consist in comminuting the fused material by cooling and mechanical means, and then drying the resultant particles at a temperature of from 110 degrees C. to 475 degrees C.

7. In the manufacture of calcium chloride, the steps which consist in bringing a cooled surface into contact with a body of such chloride in molten condition, scraping of the adherent layer or film of the chloride, whereby a flake product is formed, and then kiln-drying such product at a temperature of from 110° C. to 475° C.

8. In the manufacture of calcium chloride, the steps which consist in bringing a cooled surface into contact with a body of such chloride in molten condition, scraping of the adherent layer or film of the chloride, whereby a flake product is formed, then kiln-drying such product at a temperature of from 110° to 475° C., and finally cooling such product to at least 100° C. before packing or storing.

9. In the manufacture of calcium chloride, the steps which consist in comminuting the fused material by cooling and mechanical means, and then drying the resultant particles to superficially dehydrate the same, such dried particles having an analysis in the aggregate of not less than 71% of the anhydrous salt.

10. As a new article of manufacture, a metallic chloride containing water of crystallization and having a hygroscopic character, such chloride being in the form of particles superficially dehydrated to the point where their tendency to cake together in the package is reduced.

11. As a new article of manufacture, calcium chloride containing water of crystallization, such chloride being in the form of particles superficially dehydrated to the point where their tendency to cake together in the package is reduced.

12. As a new article of manufacture, calcium chloride containing water of crystallization, such chloride being in the form of flake-like particles and the particles being superficially dried, whereby a portion of the water of crystallization is removed.

13. As a new article of manufacture, calcium chloride containing water of crystallization, such chloride being in the form of flake-like particles analyzing not less than 71 per cent of the anhydrous salt.

14. As a new article of manufacture, calcium chloride containing water of crystallization, such chloride being in the form of flake-like particles superficially dried to the point where such particles analyze not less than 71 per cent of the anhydrous salt.

15. As a new article of manufacture a non-caking flake calcium chloride in the form of particles and having an analysis of from 71 to 75 per cent of the anhydrous salt, the particles being surface-dried.

PAUL COTTRINGER.
WILLIAM R. COLLINGS.